United States Patent [19]

Norris et al.

[11] 4,385,785
[45] May 31, 1983

[54] VEHICLE WHEEL STRUCTURE

[75] Inventors: Curtis Norris, 15905 Manufacturers St., Huntington Beach, Calif. 92649; Delmer D. Scott, Montecito, Calif.

[73] Assignee: Curtis Norris, Huntington Beach, Calif.

[21] Appl. No.: 257,189

[22] Filed: Apr. 24, 1981

[51] Int. Cl.³ .............................. B60B 7/04; B60B 7/06
[52] U.S. Cl. .................................... 301/37 SS; 301/54; 301/58; 301/69
[58] Field of Search ............ 301/37 SS, 54, 65, 58–59, 301/62, 67–70, 73–74, 78–79, 104

[56] References Cited

U.S. PATENT DOCUMENTS

| 1,819,865 | 8/1931 | Brennen | 301/62 |
| 4,180,293 | 12/1979 | Norris et al. | 301/54 |
| 4,226,478 | 10/1980 | Brown | 301/104 X |

FOREIGN PATENT DOCUMENTS

| 680233 | 4/1930 | France | 301/59 |
| 514414 | 2/1955 | Italy | 301/58 |

Primary Examiner—Charles A. Marmor
Attorney, Agent, or Firm—Georges A. Maxwell

[57] ABSTRACT

A cast metal automobile wheel with front and rear ends, an outer annular rim portion, a radially extending intermediate disc portion, a forwardly projecting central cone portion and annular series of circumferentially spaced circumferentially and radially extending wire spokes extending from the cone and disc portions to the rim portion; the spokes have radial inner ends releasably engaged in related radially outwardly disposed openings in the cone and disc portions and have spoke nuts on their radial outer ends releasably held between the rim portion and a clamp ring screw fastened to said rim portion; the rim portion and clamp ring have flat opposing annular surface; each of said annular opposing surfaces has circumferentially spaced radially extending nut seats opposing and closed by the other of said surfaces and in which related spoke nuts are engaged and captively retained.

13 Claims, 13 Drawing Figures

VEHICLE WHEEL STRUCTURE

This invention has to do with an automobile wheel and is particularly concerned with a cast metal wheel with decorative wire spokes and including novel structure releasably mounting the spokes in the wheel.

BACKGROUND OF THE INVENTION

In recent years, the use of lightweight cast magnesium and cast aluminum alloy has become extremely popular. As a result of the popularity of such wheels, the art of manufacture and design of such wheels has become competitive, crowded and highly developed.

Due to the manner in which cast metal wheels are made, they embody certain aesthetic characteristics which readily distinguish them from formed steel wheel and wire spoke wheel structures. Those distinguishing characteristics are aesthetically viewed as being very modern and such that they are a total departure from old and traditional design.

A large segment of the public interested in automobile design desires to retain certain old or traditional design characteristics in their automobiles. To this end, a great number of those persons particularly favor equipping automobiles with old fashioned wire spoke wheels, which wheels are considered to typify utmost elegance in past or old-time automobile design.

Due to the extraordinary high cost of genuine wire spoke wheels and due to the constant and very costly maintenance such wheels require, the number of persons who can afford to purchase and maintain such wheels is rather small.

In the recent past, to satisfy the desire of those who want to equip their automobile wheels with wire spoke wheels, those in the art of making cast metal wheels have developed and manufactured cast metal wheels of substantially standard construction with decorative wire spokes, in patterns, incorporated therein and which fairly simulate genuine wire spoke wheels. The foregoing simulated wire spoke wheel structures are notably less costly than genuine wire spoke wheels and are substantially maintenance free, when compared with genuine wire spoke wheels.

In some cast metal wheels with decorative wire spokes, provided by the prior art, the spokes are simply lengths of heavy and strong wire stock, arranged in some desired pattern about their related wheels, and have opposite ends engaged in socket openings or the like established in the wheels to retain the spokes in assembled relationship therewith. The ends of the spokes fit tightly in their related socket openings and the spokes are normally biased and set in compression between their opposite ends so that they are securely held against displacement and do not tend to vibrate or move about freely in a manner that would generate noise, undesired wear and the like.

In other instances, the ends of the spokes in such wheel structures have been set in place by staking the metal of the wheel about the socket openings in which the ends of the spokes are engaged.

In yet other instances, the ends of the spokes are fixed in related socket openings or the like in the wheels by deposits of epoxy cement or the like.

In all of those wheels of the general character referred to above, which we are familiar with, the decorative wire spokes are installed and set, one at a time, and are such that when installed, they cannot be easily and conveniently removed for purposes of repair, replacement and/or cleaning of the wheel structure. In all those above referred to wheel structures, the wire spokes are manually installed one at a time and their installation requires a slow time-consuming and therefore costly process of assembly.

Throughout the development of the art of cast metal wheels with decorative wire spokes, the need of a structure and/or a process which makes assembly quick, easy and economical has been recognized but not satisfactorily satisfied. Further, the need and/or desirability of such wheel structures wherein the wire spokes and wheel assemblies can be easily, conveniently and quickly disassembled and reassembled without the use of special tools and/or the excercise of special skills, to effect repair and cleaning of the wheels, has been recognized, but never fully satisfied.

As a result of the above and in light of other shortcomings found in those cast metal wheels with decorative wire spokes provided by the prior art, many potential purchasers and users of such wheels have chosen not to buy those wheels and have purchased one of many different makes of sheet metal, pan-like wheel cover structures which are provided with and carry patterns of wire spokes and which are intended to aesthetically simulate genuine wire spoke wheels. Such decorative wheel covers are such obvious imitations of genuine wire wheels that they are considered to be cheap, tinsile-like imitations which a great number of people will not buy.

Still further, in the automobile industry there is an ever-increasing number of instances where the geometry of the suspension systems of automobiles requires the central mounting disc portions of the wheels to occur on radial planes which are in close proximity with the outside or front radial planes of the automobile wheel rims. Such a relationship is common in automobiles with front wheel drive. In such cases there is insufficient space between the hub or disc portions of the wheel and the rims to accommodate a pattern of wire spokes. Accordingly, the prior art has failed to provide a satisfactory cast wheel structure with decorative wire spokes for those wheels where the central or disc portions of the wheels are on radial planes in close proximity to the outer or forward radial planes of the wheel rims.

OBJECTS AND FEATURES OF THE INVENTION

It is an object and feature of our invention to provide a novel cast metal wheel having an annular series of elongate, substantially radially and circumferentially extending wire spokes and including novel means releasably mounting the spokes in the wheel.

It is a particular object and feature of the invention to provide a wheel structure of the general character referred to above which is such that it can be effectively and rapidly assembled by unskilled labor without the use of special and costly tooling whereby the cost of manufacture of the wheel is low.

Another object and feature of the invention is to provide a novel wheel structure of the general character referred to which is such that the wire spokes can be easily and quickly assembled and mounted within the wheel without bending or otherwise biasing the spokes and wherein the spokes are releasably retained in assembled relationship with the wheel by a unitary retaining ring releasably secured to the wheel by screw fasteners.

It is an object and feature of the invention to provide a novel wheel structure of the general character referred to above wherein the spokes can be easily and quickly released and removed from the wheel for the purpose of cleaning the wheel structure and/or repairing and replacing bent or damaged spokes by releasing and removing the retaining ring.

It is an object and feature of the invention to provide a wheel structure of the character referred to above wherein the assembly, when once disassembled for servicing or the like, can be easily and quickly reassembled by anyone having ordinary skill, without the need for and use of any special tools and/or equipment.

Yet another object and feature of the invention is to provide a novel wheel structure of the character referred to wherein the pattern of spokes can be advantageously made to extend radially inwardly and axially outwardly relative to the front radial plane of the wheel rim, whereby the spokes can be and are effectively related to those wheel structures for automobiles with front wheel drive wherein the central disc portions of the wheels are on radial planes adjacent or in close proximity to the outer or front radial planes of the rims of the wheels.

The foregoing and other objects and features of our invention will be apparent and fully understood from the following detailed description of one typical preferred form and embodiment of the invention throughout which description reference is made to the accompanying drawings.

DETAILED DESCRIPTION OF THE INVENTION

The automobile wheel W that we provide includes a unitary cast metal wheel structure comprising an outer tire engaging rim R, a central disc D and a body or spider B between the rim R and the disc D.

The disc D is a flat, radially extending annular part or portion of the wheel with flat, axially outwardly and inwardly disposed front and rear surfaces 10 and 11. The disc D has a central opening 13 and an annular series of lug nut or wheel stud receiving apertures 12 in radial outward and circumferential spaced relationship from and about the opening 13.

When the wheel is in use, the disc D is arranged adjacent and is releasably secured to an axle assembly (not shown) of a related vehicle, with its rear surface 11 butting an opposing surface of a part or portion of the axle assembly and with a bearing cone and/or bearing dust cap of that assembly (if the assembly includes such parts and/or portions) projecting axially outwardly through the central opening 13. The disc C and axle assembly are releasably secured together by threaded studs carried by the axle assembly and which project through the apertures 12 and by nuts engaged on the studs and advanced into engagement with the disc; or by bolts engaged through the apertures 12 and into the axle assembly.

The above noted alternative means for mounting the wheel structure on a related vehicle are typical means which are old and well known in the art and in no way affect the novelty of the present invention.

In addition to the above, and in furtherance of the invention, the disc D is provided with an elongate axially outwardly or forwardly projecting tubular, truncated cone C about the central opening 13 and radially inward of the apertures 12, as clearly illustrated in the drawings. The front end of the cone C is open and is adapted to receive and carry a decorative closure or cap (not shown). The front end portion of the cone C is provided with two axially spaced annular series of circumferentially spaced spoke-receiving through openings, there being a front series of openings 14 and a rear series of openings 15.

The rim R includes an elongate axially extending annular body 16 with front and rear ends defined by radially outwardly projecting tire bead engaging flanges 17 and 18. But for special features which will hereinafter be described, the rim R is or can be essentially the same as any rim of those cast metal wheels which are provided by the prior art and which function to cooperatively engage and carry a pneumatic tire (not shown).

In furtherance of the present invention, the inner forward portion of the rim R is provided with an axially forwardly and radially inwardly opening annular recess 20 in which an annular cast metal clamp ring A is releasably engaged. The recess 20 has a substantially radially inwardly disposed substantially axially extending outer surface 21 and a substantially forwardly disposed radially extending bottom surface 22. The clamp ring A has a substantially radially outwardly disposed axially extending cylindrical outside surface 23 in opposing engagement with the surface 21 of the recess and a substantially rearwardly disposed and radially extending inner or rear surface 24 opposing the bottom surface 22 of the recess 20.

The clamp ring A also has a substantially flat axially forwardly disposed front surface 25 which is substantially flush with the front surface 25' defined by the front tire bead engaging flange 17 of the rim R and has a substantially radially inwardly disposed inside surface 26 which is substantially flush with an inside surface 26' of the body 16 of the rim R.

In addition to the foregoing and in furtherance of this invention, the rim R has a radially outwardly opening annular spoke nut receiving groove 30 at the radial outer portion of the bottom wall 22 of the annular recess 20. The groove 30 is preferably semicircular in cross-section with its radial outer side tangent with the surface 21 of the recess 20.

In addition to the above, the rim portion of the wheel W is provided with a plurality of elongate circumferentially spaced radially and circumferentially extending axially forwardly opening notch-like spoke nut seats 31 at or entering the bottom surface 22 of the recess 20 and communicating with the groove 30 and with the space radially inward of the rim R.

The clamp ring A has a substantially axially rearwardly and radially outwardly opening spoke nut receiving annular channel 32 which opposes the groove 30 in the ring R when the clamp ring A is in working position. The ring A further includes a plurality of circumferentially spaced substantially radially extending, axially rearwardly opening notch-like spoke nut seats 33 entering its rear surface 24 and communicating with the channel 32 and with the space radially inward of the ring A. The seats 33 are circumferentially offset from the seats 31.

The body or spider portion B of the wheel W is joined integrally with and extends radially between the disc D and rim R and includes a radial outer portion 35 and a radial inner portion 36. The inner portion 36 joins the outer peripheral portion of the disc D and extends radially outwardly and axially forwardly therefrom. The radial outer and axial forward portion of the inner portion 36 of the spider defines a radially outwardly disposed, axially extending cylindrical shoulder or surface 37. The outer portion 35 joins the inner surface 26' of the rim R, axially rearward of the spoke nut seats 31 and projects or extends radially inward and axially forward therefrom to join the inner portion 36, axially inward of the said shoulder or surface 37 thereof, as clearly shown in the drawings.

In practice, and as shown in the drawings, the portion 35 of the spider B is preferably provided with a plurality of circumferentially spaced axially extending through openings 38 to reduce the weight of the wheel and to provide for the circulation of air through the wheel structure, in accordance with common practice.

The inner portion 36 of the spider B is provided with two axially spaced series of circumferentially spaced radially outwardly opening spoke end receiving socket openings, there being an axial forward or front series of socket openings 39 and an axial inner or rear series of socket openings 40. The socket openings 39 and 40 enter the outwardly disposed shoulder or surface 37.

The forward apertured portion of the cone C projects axially forward and beyond the front radial plane or forwardmost part of the inner portion 36 of the spider B, and in the form of the invention illustrated, the forwardmost part of the inner portion 36 of the spider B is on a radial plane spaced axially forward of the front plane of the rim R.

In accordance with the above relationship of parts, the surface 21 of the recess 20 in the rim R is disposed radially inwardly and axially forwardly and the bottom surface 26 of that recess is disposed radially outwardly and axially forwardly. Further, the surfaces 23 and 24 of the clamp ring A opposing the surfaces 21 and 22 of the recess 20; the surfaces 26 and 26' of the ring A and rim R; and the axes of the nut seats 31 and 33 are inclined or disposed in a complimentary manner to facilitate or make possible assembly of the construction with parts in predetermined and desired relationship with each other.

The wheel structure A next includes three sets of spokes, there being a set of short rear spokes 50 and two sets of long front spokes including a set of front long spokes 51 and a set of rear long spokes 52.

All of the spokes 50, 51 and 52 have short, straight, radially extending inner end portions 53. The portions 53 of the spokes 50 are slidably engaged in related radially outwardly opening socket openings 39 and 40 entering the outer surface 37 of the inner portion 36 of the spider B. The inner end portions of the spokes 51 and 52 are engaged through related openings or apertures 14 and 15 in the outer forward portion of the cone C.

The short rear spokes 50 have straight elongate portions 54 angularly related to their inner end portions 53 which straight portions extend axially rearwardly, radially outwardly and circumferentially from their inner end portions to the inner surface 26' of the rim R and to related spoke nut seats 31 in the rim.

The outer ends of the spoke 50 are provided with and carry spoke nuts N. The nuts N have elongate cylindrical tubular bodies 55 in which the outer free ends of the spokes are engaged and which are seated within and extend through the spoke nut seats 31 and have spherical heads 56 at their outer ends which occur within the annular groove 30 in the rim R.

In the case illustrated, the bodies 55 of the spoke nuts N are threadedly engaged on and about their related ends of the spokes 50 and are provided with tool engaging flats 57 to facilitate advancing the nuts on the spokes and to thereby adjust their axial positioning and the resulting overall longitudinal extent of the spokes 50.

Alternatively, the nuts can be slidably engaged on the spokes and can be pressed, as at the flats 57, into fixed tight engagement on the spokes.

Further, in the case illustrated, the nut heads 56 are joined with the nut bodies by necks 58 of reduced diameter.

In the case illustrated, there are twenty spokes 50 divided into ten circumferentially spaced sets of two spokes. The two spokes of each set of spokes 50 are arranged to extend in opposite direction circumferentially of the wheel and to cross one relative to the other, intermediate their ends, as clearly illustrated in the drawings.

It is to be noted that the nut seat 31 with which each spoke 50 is related is circumferentially offset from the opening 39 or 40 in which the other end of that spoke is engaged. The inner end of one spoke 50 of each set of spokes 50 is engaged in a related opening 39 of the rear series of openings in the spider B and the inner end of the other spoke 50 of each set of spokes 50 is engaged in a related opening 40 of the forward series of openings in the spider B so that the spokes can be arranged in cross relationship with each other without requiring that they be bent or otherwise worked upon in a manner likely to cause adverse effects.

It will be further noted that the notch-like spoke nut seats 31 in the rim R are angularly related so that the nut N related thereto seat in the seats without binding or the like. The noted angular disposition of the seats 31 serve as visual aids for rapid arranging of the spokes in proper predetermined disposition during assembly of the wheel structure and prevent the spokes 50 from being improperly installed.

The spokes 51 and 52, in addition to their inner end portions 53, which are engaged in related apertures 14 and 15 in the cone C, have straight, radially extending, central portions 60, angularly related to and extending radially outwardly and circumferentially from their inner end portions 53. The spokes 51 and 52 are further provided with or include elongate straight outer portions 61 continuing longitudinally outward from the central portions 60 and axially rearwardly to related outer spoke nut seats 33 in the clamp ring A, which seats are circumferentially offset from the apertures 14 and 15 in which the inner ends of the spokes are engaged.

Terminal ends of the spokes 51 and 52 are provided with spoke nuts N which are identical with the nuts N related to the spokes 50, described above, and which are engaged in the nut seats 33 and in the channel 32 of the clamp ring A in the same manner that the nuts N on the spokes 50 are related to the seats 31 and the groove 30 of the rim R.

In the case illustrated, the radially extending central portions of the spokes 51 and 52 extend radially from the cone C to a location spaced axially forward of the forwardmost edge of the above noted inner portion 36 of the spider B. The outer portions 61 of the spokes 51 and 52 are axially inclined relative to the central portions 60 and extend to the clamp ring A, as described above and as clearly shown in the drawings.

The inner end portions 53 of the spokes 51 are engaged in the forward series of openings or apertures 14 in the cone C and the inner end portions 53 of the spokes 52 are engaged in the rear series of openings 15 in the cone C, whereby the central portions of the spokes occur in two axially spaced planes and in non-interfering cross-relationship with each other.

Figures 9, 10:
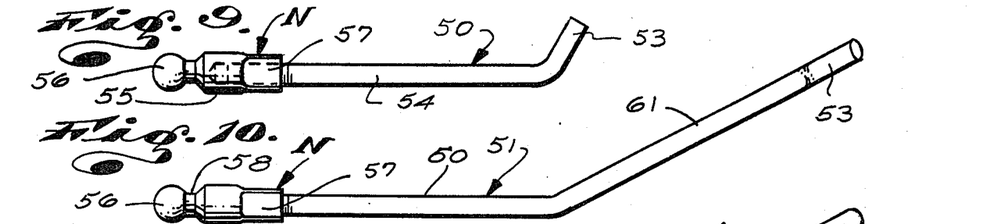
FIGS. 9, 10 and 11 are elevational views of the spoke structures embodied in our invention.
Figure 11:
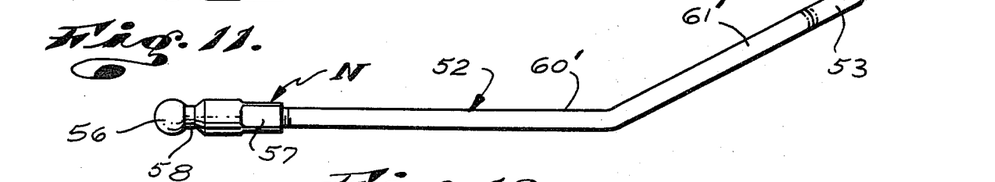

The above noted axial spacing of the central portions of the spokes requires that the central portions 60 of the spokes 51 be slightly greater in longitudinal extent that the corresponding central portion 60 of the spokes 62 and that the outer portion 61 of the spokes 51 be slightly shorter than the corresponding outer portion 61 of the spokes 52, as clearly shown in FIGS. 10 and 11 of the drawings.

Figure 1:
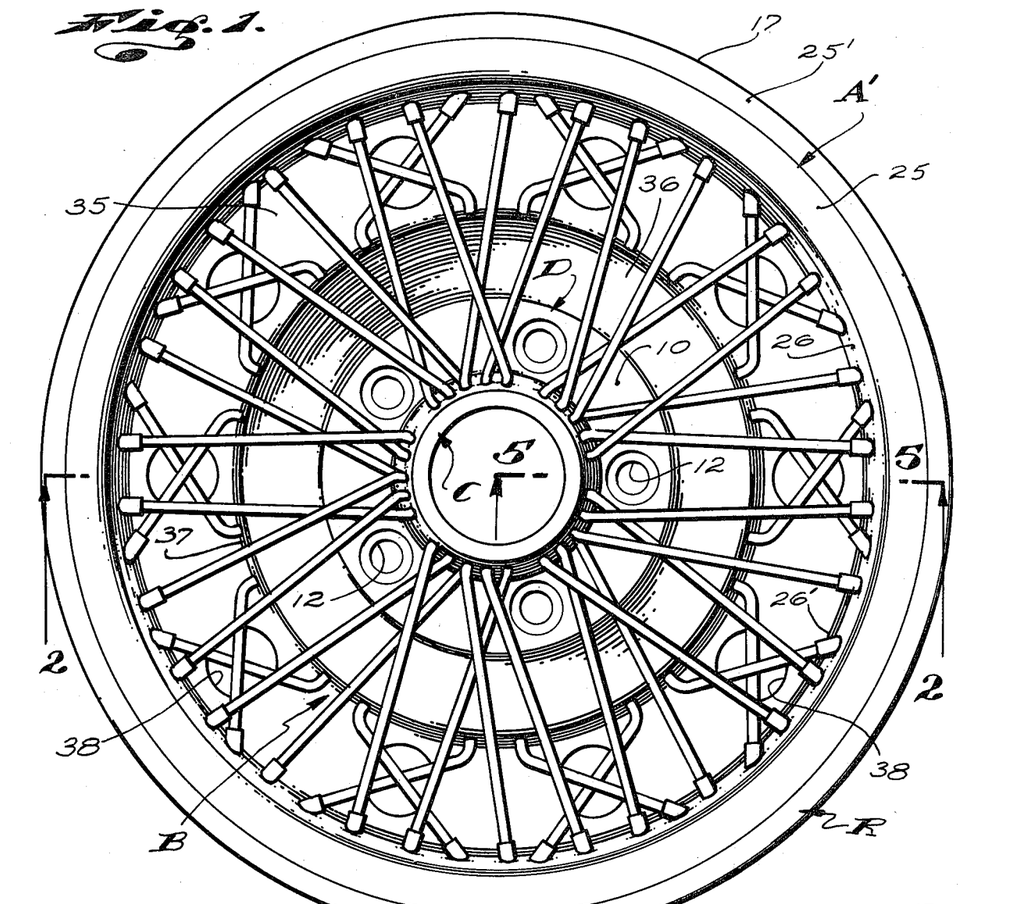
FIG. 1 is a front view of a wheel embodying the invention.
Figure 2:
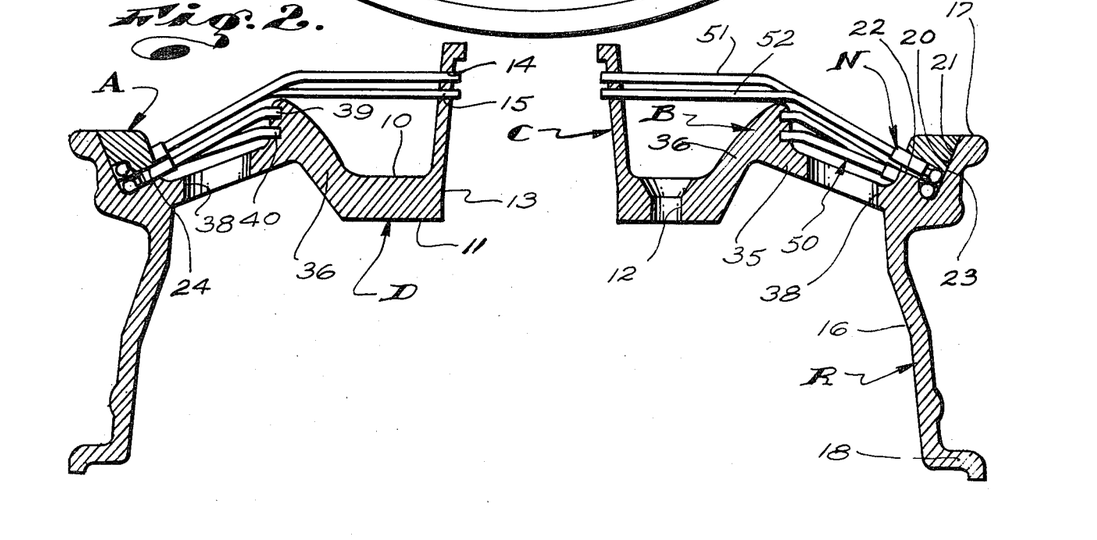
FIG. 2 is a sectional view taken substantially as indicated by line 2—2 on FIG. 1.
Figure 3:
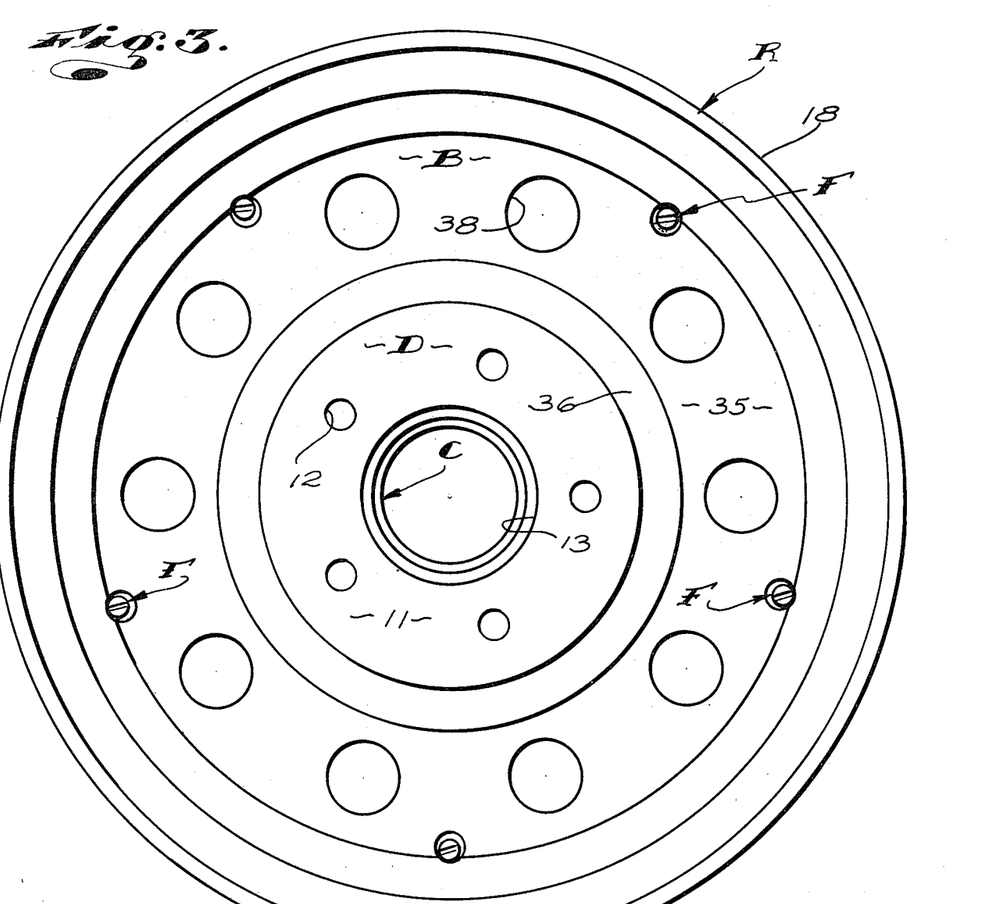
FIG. 3 is a rear elevational view of the wheel.
Figure 4:
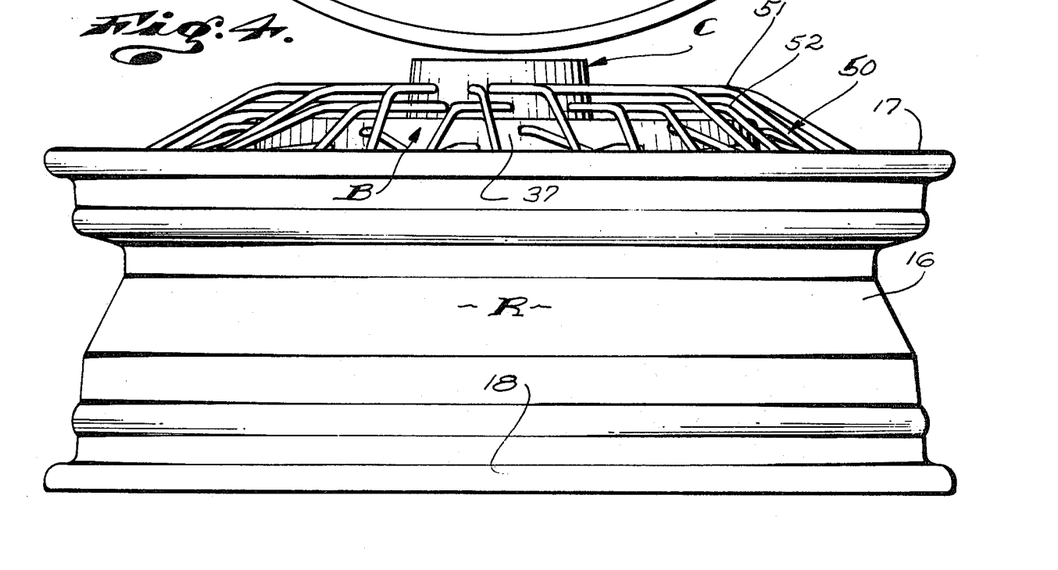
FIG. 4 is a side elevational view of the wheel.
Figures 5, 6, 7, 8:
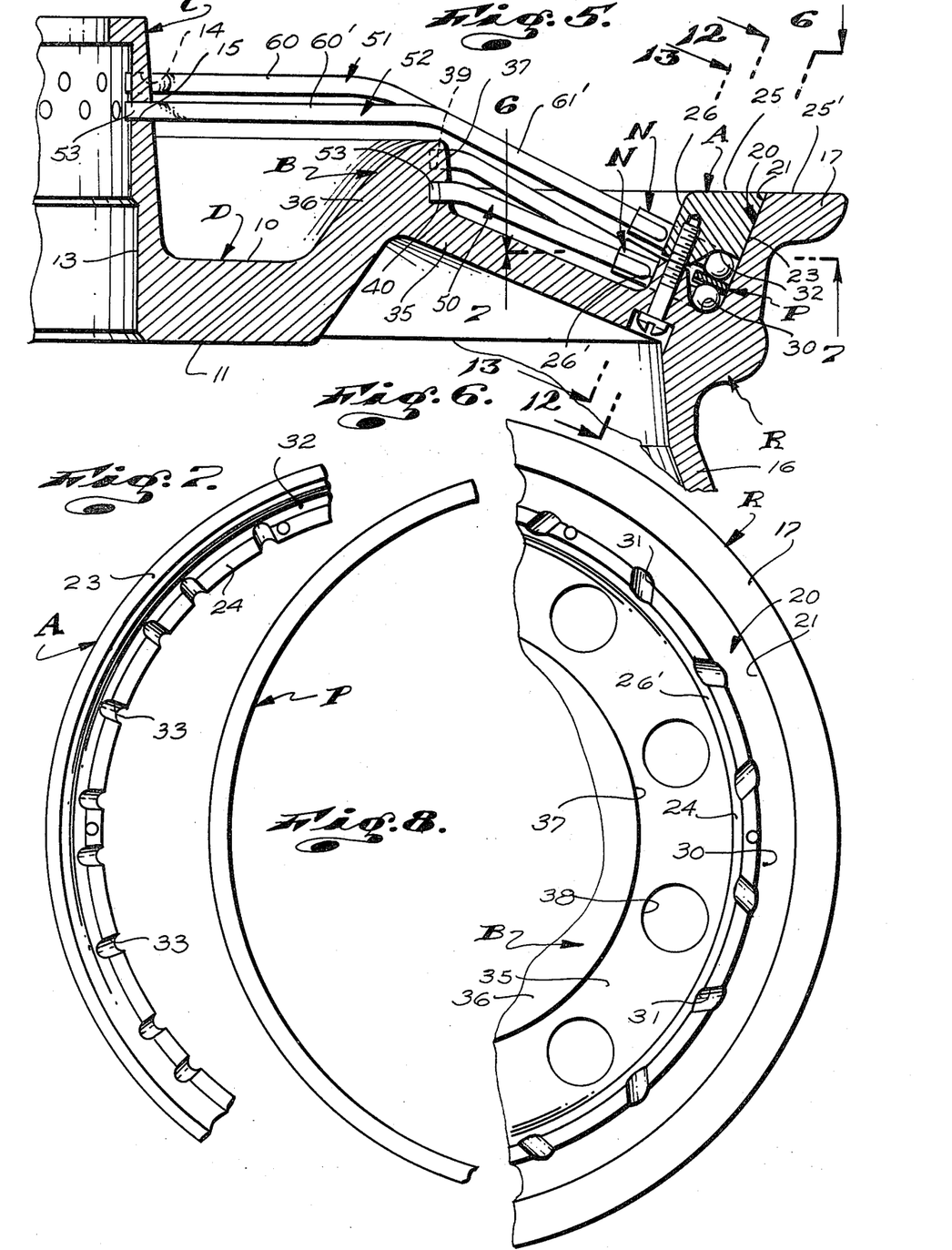
FIG. 5 is an enlarged detailed view of a portion of the structure shown in FIG. 2.
FIG. 6 is a view of reduced scale showing a portion of the structure shown in FIG. 5 and taken substantially as indicated by line 6—6 on FIG. 5.
FIG. 7 is a view of reduced scale showing a portion of the structure illustrated in FIG. 5 and taken substantially as indicated by line 7—7 on FIG. 5.
FIG. 8 is a view of a portion of a part of the wheel structure.

In addition to the above, the inner end portions 53 of the spokes 51 are angularly related to the central portions 60 of those spokes so that the spokes extend radially and circumferentially from the cone C in a counter-clockwise direction, while the inner end portions 53 of the spokes 52 are angularly related to the central portions 60 of those spokes so that they extend radially and circumferentially from the cone in a clockwise direction. With the above relationship of parts, the central portion of related spokes 51 and 52 cross one another to establish a desired spoke pattern, as clearly shown in FIG. 1 of the drawings.

Forming the spokes 51 and 52 in the above manner makes identification and manipulation of the spokes, when assembling the wheel structure, simple, quick and substantially fool-proof.

In the preferred carrying out of our invention there are fifteen spokes 51 and fifteen spokes 52. Those spokes are arranged in five definable sets of spokes, each set comprising three spokes 51 and three spokes 52. The five definable sets of spokes are arranged in circumferential spaced relationship about the wheel structure to define five gaps or spaces in the pattern of spokes, which spaces or gaps provide free access to the lug openings 12 in the disc of the wheel, from the front of said wheel. The advantages gained by the foregoing special relationship of parts is apparent.

The wheel structure W next includes a plurality of circumferentially spaced screw fasteners F engaged in and between the rim R and the clamp ring A and operating to urge and hold the ring A axially rearwardly in the recess 20 and in tight clamped holding engagement with the several spoke nuts N.

The number of fasteners F can vary as circumstances require. In the case illustrated, we have shown the wheel provided with five fasteners F to meet minimum requirements.

The fasteners F are accessible at and enter the rear side of the wheel at the junction of the rim R and the spider B and have heads which are normally arranged within countersinks formed in the wheel.

Finally, the wheel W includes an annular pressure ring P arranged between the groove 30 and the channel 32 of the rim R and ring A and between and engaging the spherical heads 56 of the nuts N on the spokes 50 and the spherical heads 56 of the nuts N on the spokes 51 and 52. The pressure ring P is a rather thin, flat resilient metal part having a flat substantially axially rearwardly disposed rear surface engaging the heads 56 of the nuts N on the spokes 50 and a flat substantially axially forwardly disposed front surface engaging the heads 56 on the nuts N on the spokes 51 and 52.

Figure 12:
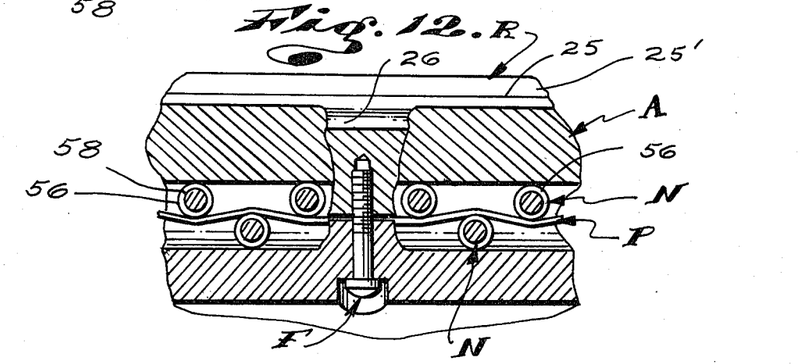
FIG. 12 is a sectional view taken substantially as indicated by line 12—12 on FIG. 5.
Figure 13:
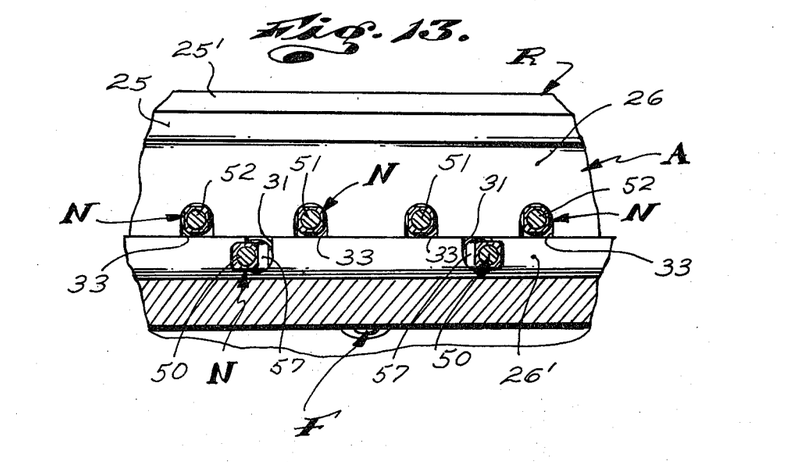
FIG. 13 is a view taken substantially as indicated by line 13—13 on FIG. 5.

The several spoke nuts N engaged by the ring P are spaced one from the other circumferentially of the ring and, for the most part, engage the front and rear surfaces of the ring P in an alternating manner whereby the ring is biased axially of the wheel by each nut at one surface thereof, between adjacent nuts at the opposite surface thereof, as clearly illustrated in FIG. 12 of the drawings.

In order to attain the above cooperative relationship between the nuts N and the pressure ring P, the groove 30 in the rim R and the channel 32 in the clamp ring A are substantially equal in depth with the diameter with the spherical heads 56 of the nuts N, whereby the rearmost part or points of the nuts N on the spokes 51 and 52 and the forwardmost points or portions of the nuts N on the spokes 50 occur on substantially the same radial plane. Accordingly, the pressure ring P must be biased axially forwarding and rearwardly about and between the nuts, as and when the clamp ring A is urged axially rearwardly and into stopped or bottomed out engagement in the recess 20 of the rim R, by the fasteners F.

With the above relationship of parts, the heads 56 of the several nuts N are urged and yieldingly held in secure and uniform pressure engagement on the bottoms of their related seats 31 and 33 and their related groove 30 or channel 32 and will not move or otherwise become displaced.

It will be readily apparent that assembly of our new wheel structure is extremely simple and can be performed quickly without any special skill and without the need to use any special tooling.

It will be further apparent that if it is desired to dismantle the wheel structure for the purpose of cleaning the several parts thereof or for the purpose of repairing and/or replacing bent or otherwise damaged spokes, it is only necessary to unscrew and remove the clamp ring A and thereby release the spokes for free handling and manipulation. Thereafter, reassembly of the wheel structure is and can be effected by a simple and fast reversal of that procedure.

In practice, the decorative spoke nuts N can be eliminated. In such a case the outer ends of the spokes extend through their releated seats 31 and 33 into their related groove 30 and channel 32 where they are engaged and are worked or acted upon by the pressure ring P in the same manner that the nuts N are worked or acted upon.

In yet another, more simplified, though not as effective, embodiment of our invention, the groove 30, channel 33 and the nuts N can be eliminated and the seats 31 and 33 can be reduced in axial depth so that the outer ends of the spokes, when seated therein, normally project a limited distance out of their related seats and engage their opposing surfaces 22 and 24 of the recess 20 and clamp ring A. With such a relationship of parts, when the structure is assembled, the noted ends of the spokes are effectively clamped between the rim and the ring. Such a modified form of our invention is not preferred as it requires the maintenance of closer tolerances than is required when the above noted pressure ring P is included, which ring effectively compensates for wide tolerances and makes manufacture of the wheel structure faster and less expensive.

Having described only one typical preferred form and application of our invention, we do not wish to be limited to the specific details herein set forth but wish to reserve to ourselves any modifications and/or variations that may appear to those skilled in the art and which fall within the scope of the following claims:

Having described our invention, we claim:

1. A vehicle wheel with front and rear ends including an elongate axially extending cylindrical rim with a radially inwardly disposed inner surface, axially spaced radially outwardly projecting front and rear tire bead engaging flanges, a forwardly and radially inwardly opening recess and a plurality of circumferentially spaced forwardly opening elongate substantially radially extending spoke seats opening forward into the recess and radially inward into the space inward of the rim, an annular clamp ring removably positioned in the recess and including a plurality of circumferentially spaced rearwardly opening spoke seats circumferentially offset from the forwardly opening spoke seats and opening rearwardly into the recess and radially inwardly into the space inward of the rim, a central wheel mounting disc concentric with and spaced radially inward of the rim, an annular radially extending spider between the disc and the rim, said disc and spider have portions with substantially radially outwardly disposed annular surfaces with circumferentially spaced radially outwardly opening spoke openings, each related to a spoke seat, and an annular series of elongate spokes with inner and outer ends, each spoke has an inner end portion engaged in a related spoke opening and an outer end engaged in a related spoke seat; and a plurality of circumferentially spaced substantially axially extending screw fasteners engaged in and between the rim and the clamp ring and releasably holding the clamp ring in the recess with the spokes held tight therebetween.

2. The vehicle wheel set forth in claim 1 wherein some of the spoke openings are circumferentially offset in a clockwise direction from their related spoke seats and other of said spoke openings are circumferentially offset in a counter-clockwise direction from their related spoke seat, whereby the spokes related to those offset spoke openings and spoke seats are pitched circumferentially as they extend radially between their related spoke openings and spoke seats and whereby certain spokes are in cross relationship with other related spokes.

3. The vehicle wheel set forth in claim 2 wherein the spoke openings related to each spoke which is in cross spoke relationship with another spoke is on a radial plane spaced axially from the radial plane on which the spoke opening for said other spoke occurs whereby those spokes cross freely.

4. The vehicle wheel set forth in claim 1 wherein each spoke seat is spaced circumferentially from each adjacent spoke seat, said rim has an annular groove opening forward into the recess and which communicates with the outer ends of the forwardly opening spoke seats, said clamp ring has an annular channel opening rearward toward the recess and which communicates with the outer ends of the rearwardly opening spoke seats, and an annular pressure ring within and between the groove and the channel forward of and engaging the outer ends of the spokes engaged in the forwardly opening spoke seats and rearward of and engaging the outer ends of the spokes engaged in the rearwardly opening spoke seats and biased axially by and between adjacent spokes.

5. The vehicle wheel set forth in claim 2 wherein each spoke seat is spaced circumferentially from each adjacent spoke seat, said rim has an annular grove opening forward into the recess and which communicates with the outer ends of the forwardly opening spoke seats, said clamp ring has an annular channel opening rearward toward the recess and which communicates with the outer ends of the rearwardly opening spoke seats, and an annular pressure ring within and between the groove and the channel forward of and engaging the outer ends of the spokes engaged in the forwardly opening spoke seats and rearward of and engaging the outer ends of the spokes engaged in the rearwardly opening spoke seats and biased axially by and between adjacent spokes.

6. The vehicle wheel set forth in claim 3 wherein each spoke seat is spaced circumferentially from each adjacent spoke seat, said rim has an annular groove opening forward into the recess and which communicates with the outer ends of the forwardly opening spoke seats, said clamp ring has an annular channel opening rearward toward the recess and which communicates with the outer ends of the rearwardly opening spoke seats, and an annular pressure ring within and between the groove and the channel forward of and engaging the outer ends of the spokes engaged in the forwardly opening spoke seats and rearward of and engaging the outer ends of the spokes engaged in the rearwardly opening spoke seats and biased axially by and between adjacent spokes.

7. The vehicle wheel set forth in claim 4 wherein the spokes have elongate spoke nuts engaged on and about their outer ends, said spoke nuts are seated in and extend through related spoke seats and engage the pressure ring.

8. The vehicle wheel set forth in claim 5 wherein the spokes have elongate spoke nuts engaged on and about their outer ends, said spoke nuts are seated in and extend through related spoke seats and engage the pressure ring.

9. The vehicle wheel set forth in claim 6 wherein the spokes have elongate spoke nuts engaged on and about their outer ends, said spoke nuts are seated in and extend through related spoke seats and engage the pressure ring.

10. The vehicle wheel set forth in claim 7 wherein the spoke nuts have cylindrical inner portions engaged in their related nut seats and spherical heads at the outer ends of the cylindrical portions within the groove and the channel and engaging the pressure ring.

11. The vehicle wheel set forth in claim 8 wherein the spoke nuts have cylindrical inner portions engaged in their related nut seats and spherical heads at the outer ends of the cylindrical portions within the groove and the channel and engaging the pressure ring.

12. The vehicle wheel set forth in claim 9 wherein the spoke nuts have cylindrical inner portions engaged in their related nut seats and spherical heads at the outer ends of the cylindrical portions within the groove and the channel and engaging the pressure ring.

13. A vehicle wheel with front and rear ends and including a central radially extending mounting disc with front and rear surfaces and a central elongate forwardly projecting cone having an annular series of radially outwardly opening spoke receiving apertures in its front end portion, an elongate cylindrical rim spaced radially outward from the disc with a radially inwardly disposed inner surface, axially spaced radially outwardly projecting front and rear tire bead engaging flanges, a forwardly and radially inwardly opening annular recess, an annular forwardly opening groove at the rear of the recess and spaced radially outward of said inner surface and a plurality of circumferentially spaced forwardly opening spoke nut seats opening forward into the recess, radially outward into the groove and radially inward into the space radially inward of the rim, an annular spider with an inner portion projecting radially outwardly from the disc and having a radially outwardly disposed annular surface with an annular series of radially outwardly opening spoke receiving openings and an outer portion projecting radially outward from said inner portion rearward of said spoke receiving openings and joining the inner surface of the rim rearward of said spoke nut seats, an annular series of substantially radially extending elongate rear spokes with inner and outer ends arranged with their inner ends engaged in related socket openings and having spoke nuts on their outer ends with body portions engaged in related forwardly opening seats and with heads in said groove, an annular clamp ring positioned in the recess and having a rearwardly opening channel opposing the groove and a plurality of circumferentially spaced rearwardly opening spoke nut seats communicating with the channel and with the space radially inward of the rim, an annular series of substantially radially extending elongate front spokes with inner and outer ends arranged with their inner ends engaged in related apertures in the cone and having spoke nuts on their outer ends with body portions engaged in related rearwardly opening spoke seats and with heads in said channel, an annular pressure ring arranged between and extending circumferentially of the groove and the channel and engaging the spoke nut heads in said groove and channel and a plurality of circumferentially spaced elongate substantially axially extending screw fasteners engaged in and between the rim and the clamp ring and releasably holding the clamp ring in the recess with the spoke nuts held tight therebetween and in pressure engagement with the pressure ring.

* * * * *